United States Patent
Uro et al.

(10) Patent No.: US 8,724,029 B2
(45) Date of Patent: May 13, 2014

(54) ACCELERATING VIDEO FROM AN ARBITRARY GRAPHICAL LAYER

(75) Inventors: Tinic Uro, San Francisco, CA (US); Benoit G. Ambry, Fair Oaks, CA (US)

(73) Assignee: Adobe Systems Incorporated, San Jose, CA (US)

( * ) Notice: Subject to any disclaimer, the term of this patent is extended or adjusted under 35 U.S.C. 154(b) by 258 days.

(21) Appl. No.: 13/116,569

(22) Filed: May 26, 2011

(65) Prior Publication Data

US 2013/0129324 A1 May 23, 2013

(51) Int. Cl.
*H04N 5/265* (2006.01)

(52) U.S. Cl.
USPC ........................................................ 348/585

(58) Field of Classification Search
USPC ................... 348/563–567, 584–586; 345/637
See application file for complete search history.

(56) References Cited

U.S. PATENT DOCUMENTS

| | | | | |
|---|---|---|---|---|
| 4,360,831 A | * | 11/1982 | Kellar | 348/585 |
| 4,684,990 A | * | 8/1987 | Oxley | 348/585 |
| 4,758,892 A | * | 7/1988 | Bloomfield | 348/585 |
| 4,853,784 A | * | 8/1989 | Abt et al. | 348/585 |
| 4,876,600 A | * | 10/1989 | Pietzsch et al. | 348/588 |
| 4,879,597 A | * | 11/1989 | Barton et al. | 348/42 |
| 5,027,213 A | * | 6/1991 | Kamin | 348/585 |
| 5,056,044 A | * | 10/1991 | Frederickson et al. | 345/568 |
| 5,077,608 A | * | 12/1991 | Dubner | 348/583 |
| 5,214,512 A | * | 5/1993 | Freeman | 348/585 |
| 5,231,499 A | * | 7/1993 | Trytko | 348/585 |
| 5,260,695 A | * | 11/1993 | Gengler et al. | 345/592 |
| 5,305,108 A | * | 4/1994 | Trytko | 348/594 |
| 5,475,812 A | * | 12/1995 | Corona et al. | 715/807 |
| 5,530,797 A | * | 6/1996 | Uya et al. | 345/532 |
| 6,466,220 B1 | * | 10/2002 | Cesana et al. | 345/537 |
| 6,888,577 B2 | * | 5/2005 | Waki et al. | 348/589 |
| 8,204,357 B2 | * | 6/2012 | Hamada et al. | 386/239 |
| 2003/0235304 A1 | * | 12/2003 | Evans et al. | 380/216 |
| 2005/0122335 A1 | * | 6/2005 | MacInnis et al. | 345/520 |
| 2009/0228782 A1 | | 9/2009 | Fraser | |
| 2010/0079489 A1 | * | 4/2010 | Cheng et al. | 345/629 |

FOREIGN PATENT DOCUMENTS

EP  0002800582 A2 * 8/1988
JP  410301557 * 11/1998

OTHER PUBLICATIONS

Adelson, Edward, "Layered Representation for Vision and Video", IEEE, 1995.*
"Bussiness Wire"—"Chyron Corp" announces release of "Concerto" copositing software, 1998.*

* cited by examiner

*Primary Examiner* — David Harvey
(74) *Attorney, Agent, or Firm* — Wolfe-SBMC

(57) ABSTRACT

Video content from a layer of multiple multimedia content layers may be moved to a lowest content layer. The region of the multimedia content layer that previously contained the video content may be replaced with a transparent region. Additional layers that exist between the layer from which the video content was removed and the lowest layer may likewise have corresponding regions replaced with transparent regions. The content layers may be composited together at a display time. Accordingly, the video content of the lowest content layer may be viewed through the transparent regions, which may allow the video to be seen as originally authored. The lowest content layer may be rendered independently of other layers. In some embodiments, the content layer containing video may be performed with dedicated hardware (e.g., a GPU).

20 Claims, 5 Drawing Sheets

ACCELERATING VIDEO FROM AN ARBITRARY GRAPHICAL LAYER

BACKGROUND

1. Technical Field

This disclosure relates generally to media playback, and more specifically, to accelerated media playback.

2. Description of the Related Art

Multimedia content usually consists of graphical elements organized into layers, with the layers controlling the order in which the graphical elements are drawn. The graphical elements on higher layers obscure (or are drawn on top of) the graphical elements of lower layers. Accelerated video playback, for example, by a graphics processing unit (GPU), typically requires video to be on the lowest layer. To accelerate video playback, graphics can be overlaid on top of video, however, video cannot be drawn on top of graphics. Thus, existing multimedia content, which may include video on any graphical layer, may not permit accelerated video playback.

SUMMARY

This disclosure describes techniques and structures for accelerating video from an arbitrary graphical layer. In one embodiment, content, such as multimedia content, may be received. Multimedia content may include multiple content layers including one layer that includes video content. The multimedia content may specify a rendering order of the multiple content layers. In one embodiment, the multimedia content may specify that the content layer that includes video content is not at the lowest content layer of the rendering order. Video content may be moved from that one layer to the lowest layer. The region of each layer between the one layer from which the video content was moved and the lowest content layer may be replaced with a transparent region. Each replaced region may correspond to the location from which the video content was moved. The multimedia content may be sent to a rendering system including sending the lowest content layer to an accelerated video renderer of the rendering system. In one embodiment, the rendering system may require that video content be at the lowest content layer for accelerated rendering. The layers may be composited together such that the video on the lowest layer may be viewed through the transparent regions, which may allow the video to be seen as originally authored. The lowest content layer may be rendered independently of other layers. In some embodiments, the independent rendering may be performed with dedicated hardware (e.g., a GPU or dedicated video decoder). The content layers may be composited together at a display time.

In some embodiments, the multimedia content, as originally received, may include at least one higher content layer of the multiple content layers that is above the one content layer that includes the video content. The at least one higher content layer may be sent to the rendering system without replacing a region in the higher content layer with a transparent region. As such, the higher content layer may be seen as originally authored without video content, which was originally authored at a lower content layer, obscuring the higher content layer.

Figure 1:
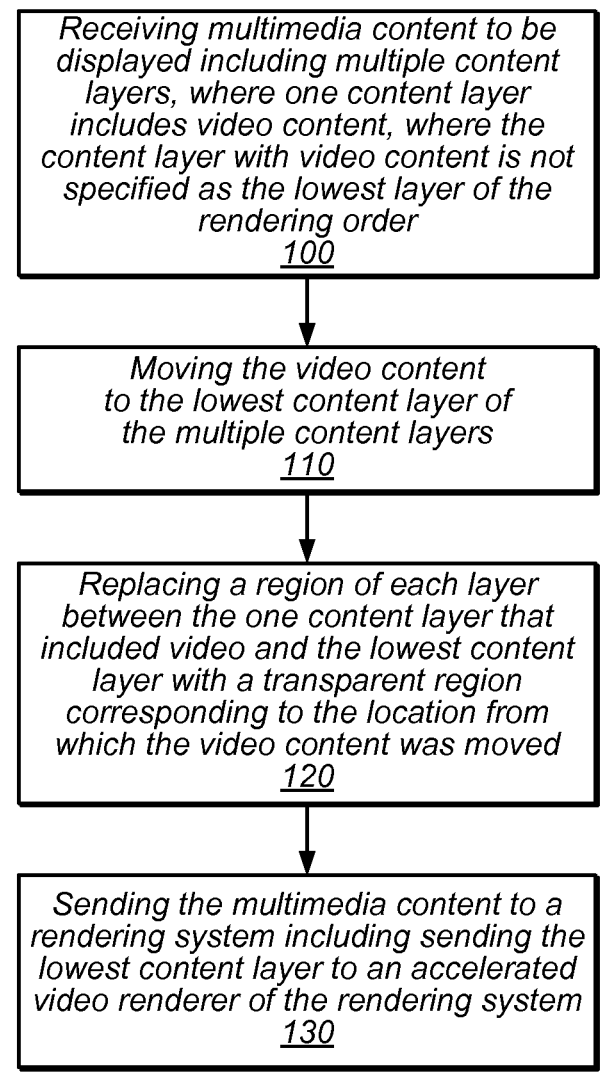
FIG. 1 is a flowchart of a method for moving video content to a lower content layer, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of methods and apparatus for moving video content from one multimedia content layer to another are described. Some embodiments may include a means for moving video from one multimedia content layer to a lowest content layer. For example, a video moving module may receive various content layers as input and move the video content from one content layer to a lowest content layer. One or more rendering modules may render the video content layer separately from the other content layers. A compositing module may composite the layers together at a display time. The video moving, rendering, and compositing modules may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform moving video content from one multimedia content layer to a lowest content layer, rendering the content laying containing video independently of the other content layers, and compositing the layers together at a display time, as described herein. Other embodiments of the video moving, rendering, and compositing modules may be at least partially implemented by hardware circuitry and/or firmware stored, for example, in a non-volatile memory.

Turning now to FIG. 1, one embodiment for moving video content to a lowest content layer is shown. While the blocks are shown in a particular order for ease of understanding, other orders may be used. In some embodiments, the method of FIG. 1 may include additional (or fewer) blocks than shown. Blocks 100-130 may be performed automatically or may receive user input.

As indicated at 100, multimedia content, which may include multiple content layers, may be received. Content layers may include two-dimensional (2D) content and video content. In one embodiment, the multimedia content may specify a rendering order of the content layers. The received multimedia content may not specify that the content layer including video content is at the lowest content layer of the rendering order. 2D content may include regular vector graphics, RGB data, etc. Video may include hardware accelerated or hardware decoded video. A layer of multimedia content may additionally include three-dimensional (3D) vector graphics. In one embodiment, video content may be encoded using an accelerated codec (e.g., H.264). Video encoded with an accelerated codec may facilitate full GPU acceleration through rendering.

The various layers of multimedia content may be represented by a display list. A display list may be used to describe how graphical elements are composited together (e.g., specify a rendering order). Thus, the display list may be used as a display graph. The display list may include a hierarchical representation of the contents of any vector graphics or video (or 3D vector graphics). An object in the display list may include sub-objects that represent vector graphics, video, or 3D graphics. The display list may also include a depth that may indicate the rendering/compositing/layering order. As an example, the display list may indicate that a lowest layer be rendered first, a next lowest layer be rendered on top of the lowest layer, and so on until reaching a highest layer. Higher layers may obscure or partially obscure lower layers in the display list. Any processing (e.g., blending, filtering) may occur in a similar order.

At 110, video content may be moved to the lowest content layer of the multiple content layers. Moving the video content may include determining one or more locations where video content exists in a layer and removing the video content from the layer. In one embodiment, a location of video content or video graphical objects may be determined by searching the display list. Based on the display list, the position of the video content may be calculated or determined. The video content may be removed from the display list and moved to a different location in the display list to reflect the video content's relocation to the lowest content layer, thereby modifying the actual display list. Accordingly, the video object that previously existed in one layer may now exist in the lowest compositing layer, or video layer. In one embodiment, the location where the video was removed from, in terms of the display list hierarchy, may be retained or stored for use at block 120.

Figure 2:
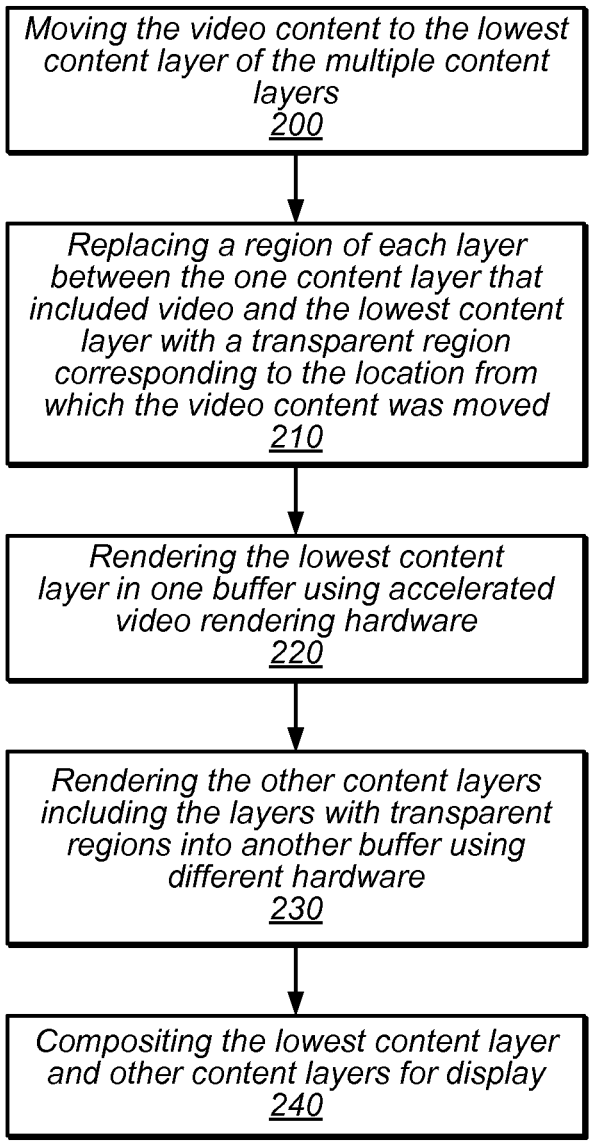
FIG. 2 is a flowchart of a method for moving video content to a lower content layer and rendering and compositing various content layers, according to some embodiments.

As shown at 120, a region of each layer between the one content layer, including the one content layer, and the lowest content layer may be replaced with a transparent region. Each replaced region may correspond to the location from which the video content was removed from its original layer. In one embodiment, the location in the display list may identify the region to be replaced with a transparent region (e.g., alpha transparent blank pixels). A transparent region, as used herein may be described as a hole cut in the 2D pixel vector. The transparent region may allow video content that was pushed to a lower layer to show through to the top, or at least as close to the top as originally authored. Other layers may exist between the layer from which the video was removed and the lowest content layer to which the video was moved. In one embodiment, each layer below the layer from which the video content was removed may likewise include a transparent region (i.e., alpha transparent blank pixels) corresponding to the original video content location. In that manner, portions of layers an original content author intended to be below video content may have the same effect of not obscuring the video content. In one embodiment, layers above the content layer in which the video was removed may remain intact. Accordingly, if a portion of a layer originally obscured or partially obscured the video content, it may still obscure the video content after the video content is pushed to the lowest content layer. In other words, graphical elements authored to be layered above the video may still be overlaid on top of the video as expected. Such higher layers may be sent directly to the rendering system (e.g., CPU, GPU, video decoder, buffers, compositing hardware, etc.) without replacing a region in the higher layer with a transparent region. In some embodiments, block 120 may be performed as part of the rendering of blocks 220-230, as shown in FIG. 2.

Blocks 100-120 may repeat for different layers of multimedia content. For example, consider multimedia content that includes four layers. Let the second and third layers (from the top) include both video and 2D vector graphics. In one embodiment, the second layer from the top may proceed through blocks 100-120 with the result being a fourth (lowest) layer including the video that was previously in the second layer and the second and third layers including a transparent "hole." The third layer may also proceed through blocks 100-120 with the result being the fourth layer including the video that was previously in the third layer and the third layer including another transparent "hole." Note that the first (topmost) layer may remain unaffected such that any graphics elements that were authored to obscure the video content may continue to obscure the video content. The four-layer example described in this paragraph may proceed as described, sequentially from the top-most (highest) layer to the bottom-most (lowest) layer, or it may proceed sequentially from the bottom-most layer to the top-most layer, or it may proceed in parallel.

In one embodiment, video content originally from one higher layer may obscure video content originally from a lower layer. When both video elements are pushed to the lowest layer, the original composited view may be retained and a portion of the originally obscured video may be cut to accommodate the originally obscuring video.

Video content and 2D vector graphics may coexist in an originally authored lowest layer. In one embodiment, video content may be removed and moved to a new even lower layer and the region that contained video content in the original lowest layer may be replaced with alpha transparent pixels, as described in 100-120. In one embodiment, the 2D vector graphics may be moved to a next higher layer and a transparent hole may be cut in that layer so that the 2D vector graphics may not obscure the video content.

In certain situations, original video content may be authored to blend with graphical elements beneath it (i.e., from lower content layers). Or, the original video content may have a filter or some sort of processing applied to it. In one embodiment, a blending, filter, blur, or processing may be detected and that video content may not be moved to the lowest layer and may not be hardware accelerated. In some embodiments, if the hardware is capable of blur, for example, then the blur may be applied in the hardware such that the video may be moved to the lowest layer and hardware accelerated. In some embodiments, the blur, filter, or processing may be ignored and the video content may be pushed to the lowest layer and hardware accelerated. Ignoring the processing, though, may cause the video content to be rendered in a different manner than originally intended.

At 130, the multimedia content, including the video content that has been moved to the lowest layer, may be sent to a rendering system. The rendering system may include a CPU, GPU or dedicated video decoder hardware, buffers, compositing hardware, among other components. Sending the multimedia content to the rendering system may include sending the lowest content layer to an accelerated video renderer of the rendering system. In some embodiments, the rendering system may require that video content be at the lowest content layer for accelerated rendering. In such an embodiment, other content layers may be sent to different hardware in the rendering system (e.g., a graphics renderer implemented by the CPU).

By pushing video content to the lowest layer and cutting "holes" in one or more layers, existing content may be hardware accelerated yet retain characteristics of the originally authored content. As a result, speed and efficiency of hardware, such as GPUs, may be utilized thus reducing the load on a central processing unit (CPU). Further, video may be accelerated for existing multimedia content without requiring authors to first alter the content to make it compatible with hardware acceleration.

Turning now to FIG. 2, one embodiment for moving video content to a lower content layer and rendering and compositing the various content layers is shown. While the blocks are shown in a particular order for ease of understanding, other orders may be used. In some embodiments, the method of FIG. 2 may include additional (or fewer) blocks than shown. Blocks 200-240 may be performed automatically or may receive user input. Additionally, the method of FIG. 2 may be used in conjunction with blocks 100-130.

As illustrated at 200 and 210, video content may be moved to the lowest content layer of the multiple layers and a region of each layer between the one content layer that included the video content and the lowest content layer may be replaced with a transparent region. The transparent region may correspond to the location from which the video content was moved. Blocks 200 and 210 are similar to blocks 110 and 120 of FIG. 1.

As shown at 220 and 230, the lowest content layer and other content layers may be rendered in separate buffers. The lowest content layer and the other content layers may be rendered independently (e.g., the lowest content layer and the other content layers may be rendered using separate hardware). In this way, each layer may be updated independently with its own timer, e.g., asynchronously. The video layer, in some embodiments, may be rendered on a dedicated chip in a system while other content layers may be rendered by a graphics renderer on the CPU. For example, video may be rendered using a specific hardware video decoding chip or GPU that may drive the video layer completely. This may allow full GPU acceleration of the video, from decoding to presentation. Consider an example with two layers, a lowest layer that includes video graphics elements and a higher layer that includes 2D vector graphics. In such an example, the video may be on a hardware plane underneath a central processing unit (CPU) plane. Accordingly, when the video changes, the rendering may be updated on the hardware plane but the video may not be copied back from the hardware plane to the CPU. Thus, the CPU may not have to render anything when the video changes. As a result, the video content layer may never interact with the CPU and may take advantage of hardware acceleration. Further, read-back (i.e., sending data from GPU to the CPU) may not be necessary to composite the video frames, as discussed below at block 240. The hardware decoder may skip operations that would otherwise require use of software in a CPU. In one embodiment, the video may be pre-rendered before run time or display time. Additionally, the video layer may include multiple video sub-layers. In some embodiments, however, only one video of multiple videos may be composited at a time (e.g., on mobile devices). Further, actual video may or may not take up the full video layer. In one embodiment, video frames may not be presented inside the display list but rather inside a texture sitting behind the stage painted through the GPU. This may allow content available on the graphics card memory to be directly painted on screen.

In one embodiment, rendering in block 230 may include replacing the region of a layer, from which video content was removed, with a transparent region. In one embodiment, the location in the display list may identify the region to be replaced with alpha transparent blank pixels. The alpha transparent blank pixels may allow video content that was pushed to a lower layer to show through to the top, or at least as high as originally authored. Other layers may exist between the layer from which the video was removed and the lowest content layer to which the video was moved. In one embodiment, each layer above the lowest layer and below the layer from which the video content was removed may be rendered by replacing the region corresponding to the original video content location with alpha transparent blank pixels. In that manner, portions of layers originally intended to be below video content may have the same effect of not obscuring the video content.

In one embodiment, the various content layers may update asynchronously. For example, video content may be updated at 20 frames per second (fps), while a vector layer (e.g., a subtitle layer) may update every 2 seconds. Updating asynchronously may avoid sync issues by allowing video to play at its frame rate, be decoded by hardware and presented at an appropriate frame rate while, at the same time, other elements may be updated independently and presented at a higher rate. At a given time t, all layers may present a correct or appropriate state. Thus, rendering may occur at an appropriate rate. A media player may provide a global time that may further facilitate correct rendering.

As shown at 240, the rendered layers may be composited together. The composited layers may then be provided to a display pipe. Composition may be performed, in one embodiment, by a GPU. The GPU may be a dedicated piece of hardware for performing composition of the content layers or it may be built-in to a GPU that rendered one of the content layers. Compositing may be performed with alpha blending from the bottom to the top layer so that the layers may interact. In one embodiment, at display time, the hardware that rendered the video may feed frame by frame of the video to the GPU to be composited with the other layers. In this manner, video may be flexible by frame rate or by switching between streams. In some embodiments, the GPU may include a buffer and a piece of hardware that performs the blending. In some embodiments, an API may perform the blending. As described above, the layers may be updated asynchronously. This may allow all layers to be properly displayed regardless of which layer is updated. In embodiments with 3D content, the 3D content may utilize GPU anti-aliasing as the 3D content is moved to the final display.

By moving video graphics elements to a lowest layer, the graphics layer and other layers may be rendered at near native performance of the hardware performing the rendering. Further, by replacing portions of some layers with alpha transparent pixels, original ordering of content may be preserved. High performance rendering may take advantage of hardware acceleration, for example, in a GPU or other dedicated hardware. In doing so, rendering and compositing may not rely as heavily on software, which may result in greater speeds and reduced power usage. Thus, devices with less powerful CPUs but adequate video decoding capabilities (e.g., televisions, set-top boxes, mobile devices, etc.) may render video, including 3D, at higher frame rates.

Figure 3A:
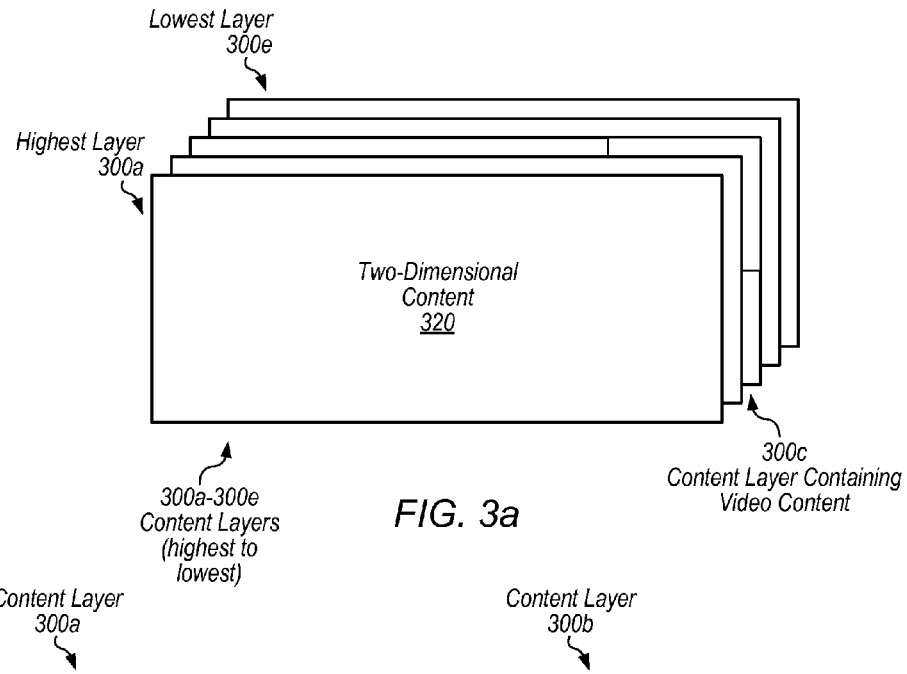
FIGS. 3a-3b illustrate an example of moving video content from a multimedia content layer to a lower content layer, according to some embodiments.
Figure 3B:
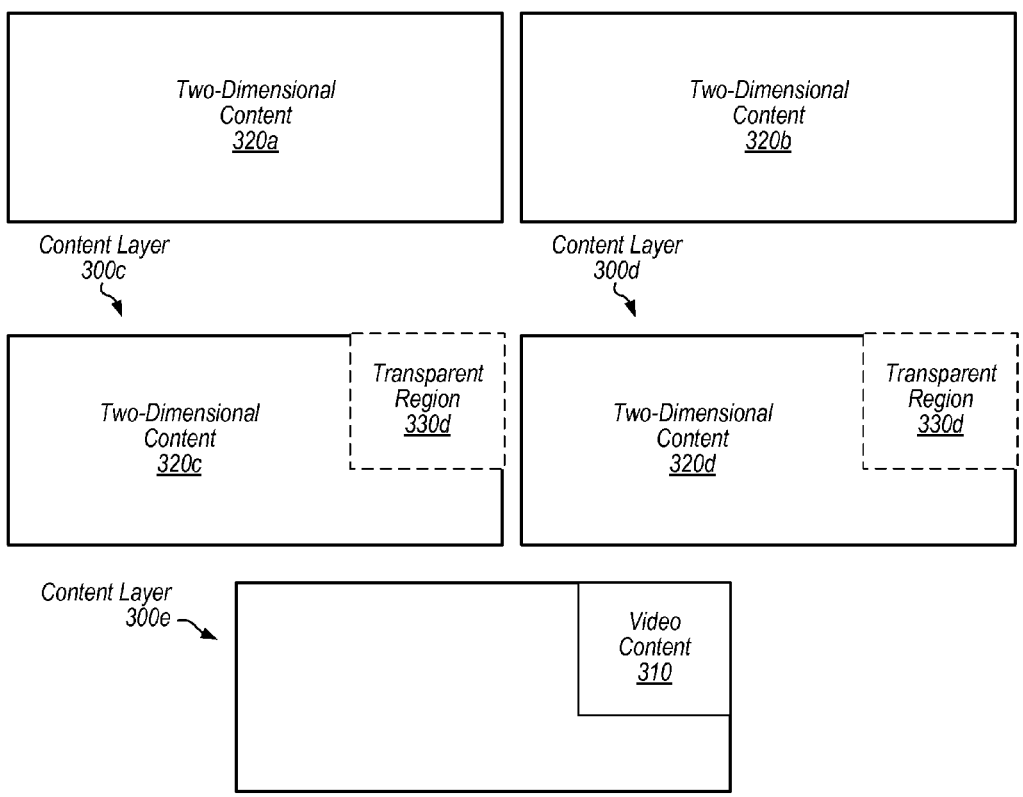

FIGS. 3a-3b illustrate an example of separating video content from a multimedia content layer and moving it to a lower content layer, according to some embodiments. In the illustrated embodiment of FIG. 3a, five content layers 310a-310e are received. Content layer 310c, the middle layer of the five layers, may include video content 310. Two layers, content layers 310a and 310b may originally be above content layer 310c while two layers, content layers 310d and 310e may originally be below content layer 310c. Any or all of the content layers 310a-310e may include 2D content 320. For simplicity of explanation, content layer 300e, as shown in FIG. 3b, initially included no 2D content. In other embodiments, however, content layer 300e may include content, such as 2D vector graphics, video, or 3D vector graphics.

As illustrated in FIG. 3b, video content 310 may moved from content layer 300c to the lowest content layer 300e, according to various embodiments. In one embodiment, a hierarchical display list may be searched for video content, which may result in a located portion of content layer 300c corresponding to video content 310. Video content 310 may be moved in the display list to a lowest layer, here represented by content layer 300e. The region in content layer 300c where video content 310 was originally located may be replaced with alpha transparent pixels, shown as transparent region 330c in FIG. 3b. FIG. 3b also illustrates a layer 300d, between the layer from which video content 310 was moved and the lowest layer, in which a region corresponding to the video content has also been replaced with a transparent region, shown as transparent region 330d. Video content 310 is shown as moved to the lowest layer, content layer 300e. Accordingly, when the layers are composited together for display, video content 310 from the lowest layer, content layer 300e, may show through transparent regions 330c and 330d of content layers 300c and 300d, respectively, and be unobscured by those layers, consistent with the originally authored content. As shown, content layers 300a and 300b, which were originally authored above the content layer 300c that included video content 310, do not include regions replaced with transparent pixels. Thus, content layers 300a and 300b may be displayed as originally authored and may be overlaid on top of content layers 300c, 300d, and 300e including on top of video content 310.

Example Implementations

Figure 4:
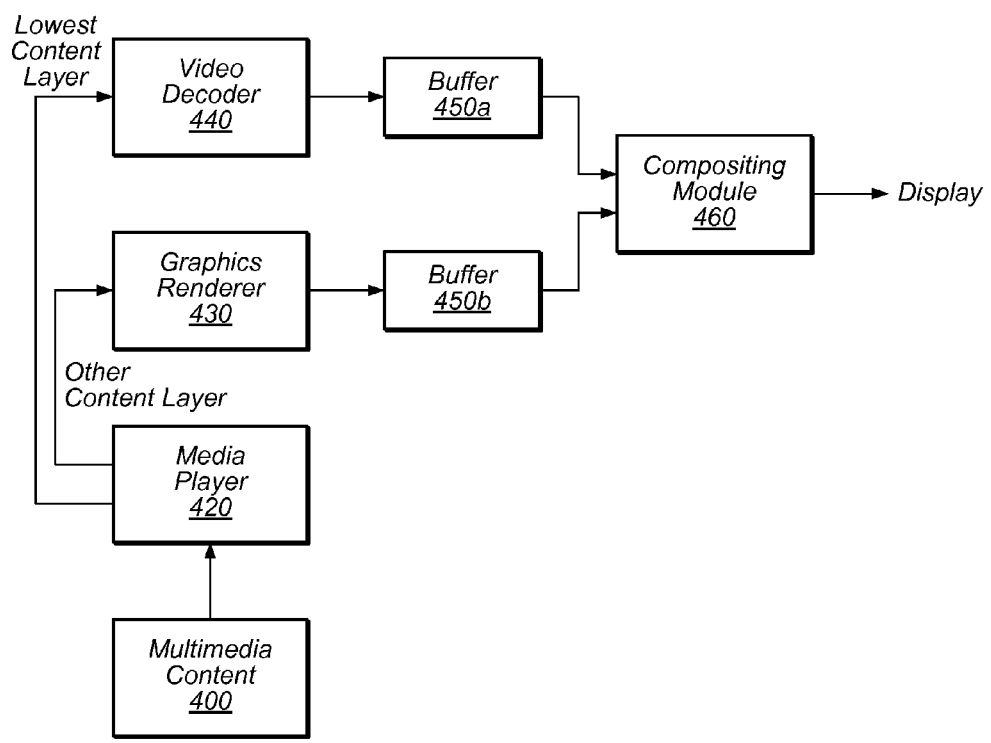
FIG. 4 illustrates an example implementation of moving video from one multimedia content layer to another and rendering and compositing the various content layers, according to some embodiments.

FIG. 4 illustrates an example implementation for moving video from one multimedia content layer to another and rendering and compositing the various content layers, according to some embodiments. FIG. 4 includes a media player 420, which may be implemented on a CPU, that receives multimedia content 400 and which may implement a video moving module (not shown) that may implement video content moving techniques illustrated in FIGS. 1-3. FIG. 4 also includes a rendering module, shown as graphics renderer 430, for rendering content layers not including video content (e.g., layers other than the lowest content layer). Video decoder 440 may implement a rendering module for rendering the lowest content layer (e.g., the content layer containing the moved video content). In other embodiments, the rendering module for rendering the lowest content layer may be implemented on other hardware, such as a GPU, or other video decoding hardware other than video decoder 440. Each of graphics renderer 430 and video decoder 440 may render respective content layers into buffers 450a and 450b, respectively. Buffers 450a-450b may be memory in a CPU, such as memory allocated to media player 420, or other memory of the device containing the CPU. Compositing module 460 may composite the separately render layers from buffers 450a and 450b for display. In various embodiments, compositing module 460 may be implemented on the same hardware implementing video decoder 440, some other video hardware (e.g., a GPU), or on CPU. Video decoder 440, graphics rendered 430, buffers 450a-450b, and compositing module 460 may collectively be called the rendering system. Additional or fewer components than those shown in FIG. 4 may be present in the rendering system.

Example System

Figure 5:
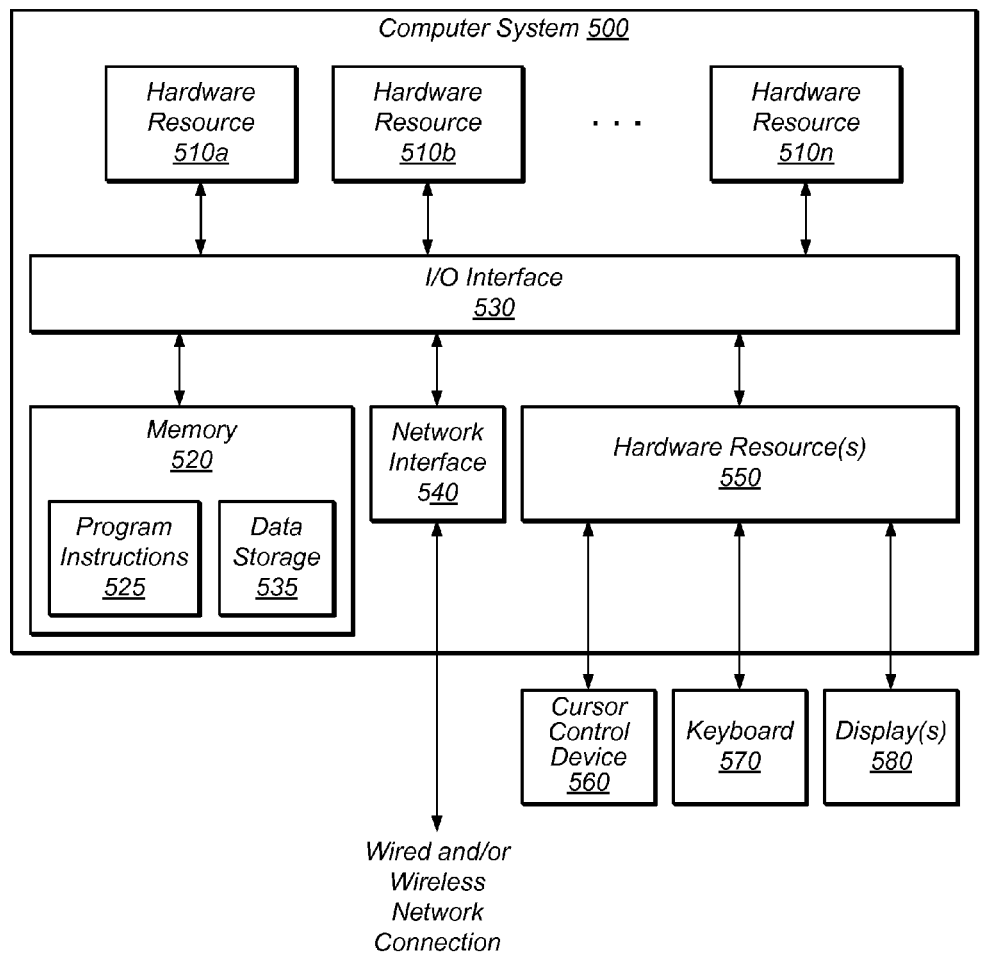
FIG. 5 illustrates an example computer system that may be used in embodiments.

FIG. 5 illustrates a device by which a multimedia player may present a multimedia presentation according to the video content moving, rendering, and compositing techniques as described herein. The device may interact with various other devices. One such device is a computer system 500, such as illustrated by FIG. 5. In different embodiments, the device may be any of various types of devices, including, but not limited to, a personal computer system, desktop computer, laptop, notebook, or netbook computer, mainframe computer system, handheld computer, workstation, network computer, a camera, a set top box, a television, a mobile device, personal digital assistant, smart phone, a consumer device, video game console, handheld video game device, application server, storage device, a peripheral device such as a switch, modem, router, or in general any type of computing or electronic device.

In the illustrated embodiment, computer system 500 includes one or more hardware resources 510 and 550, at least some of which may be coupled to a system memory 520 via an input/output (I/O) interface 530. Hardware resources 510 and 550 may include one or more processors, such as CPUs and/or GPUs, one or more video decoders, and/or other rendering or compositing hardware. Computer system 500 further includes a network interface 540 coupled to I/O interface 530, and one or more input/output devices, such as cursor control device 560, keyboard 570, and display(s) 580. In some embodiments, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor, or a multiprocessor system including several processors (e.g., two, four, eight, or another suitable number). Processors may be any suitable processor capable of executing instructions. For example, in various embodiments, processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a GPU. A GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more APIs that permit programmers to invoke the functionality of the GPU(s). Suitable GPUs may be commercially available from vendors such as NVIDIA Corporation, ATI Technologies (AMD), and others.

GPUs, such as one or more of hardware resources 550 may be implemented in a number of different physical forms. For example, GPUs may take the form of a dedicated graphics card, an integrated graphics solution and/or a hybrid solution. The dedicated graphics card may be a 3D graphics card. A GPU may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit and the rest of the computer system 500 may travel through a graphics card slot or other interface, such as I/O interface 530 of FIG. 5.

Note that program instructions 525 may be configured to implement a graphics application (e.g., a multimedia player as described herein) as a stand-alone application, or as a module of another graphics application or graphics library, in various embodiments. For example, in one embodiment program instructions 525 may be configured to implement graphics applications such as painting, editing, publishing, photography, games, animation, and/or other applications, and may be configured to provide the functionality described herein. In another embodiment, program instructions 525 may be configured to implement the techniques described herein in one or more functions or modules provided by another graphics application executed on a GPU and/or other hardware resources 510 or 550 (e.g., a video moving module, rendering module, and/or a compositing module). These modules may be executable on one or more of CPUs and/or GPUs to cause computer system 500 to provide the functionality described herein. The multimedia player may be implemented in various embodiments using any desired programming language, scripting language, or combination of programming languages and/or scripting languages, e.g., C, C++, C#, Java™, Perl, etc. For example, in one embodiment, the multimedia player may be JAVA based, while in another embodiments, it may be implemented using the C or C++ programming languages. In other embodiments, the multimedia player may be implemented using specific graphic languages specifically for developing programs executed by specialized graphics hardware, such as a GPU. In addition, the multimedia player take advantage of memory specifically allocated for use by graphics processor(s), such as memory on a graphics board including graphics processor(s). Program instructions 525 may also be configured to render images and present them on one or more displays as the output of an operation and/or to store image data in memory 520 and/or an external storage device(s), in various embodiments.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a multimedia player, video moving module, rendering module(s), and/or compositing module are shown stored within system memory 520 as program instructions 525 and data storage 535, respectively. In other embodiments, program instructions and/or data may be received, sent or stored upon different types of computer-accessible media or on similar media separate from system memory 520 or computer system 500. Generally speaking, a computer-accessible medium may include storage media or memory media such as magnetic or optical media, e.g., disk or CD/DVD-ROM coupled to computer system 500 via I/O interface 530. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 540.

In one embodiment, I/O interface 530 may be configured to coordinate I/O traffic between a processor 510, system memory 520, and any peripheral devices in the device, including network interface 540 or other peripheral interfaces. In some embodiments, I/O interface 530 may perform any necessary protocol, timing or other data transformations to convert data signals from one component (e.g., system memory 520) into a format suitable for use by another component (e.g., a processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Hardware resource(s) 550 may, in some embodiments, support one or more display terminals, keyboards, keypads, touchpads, scanning devices, voice or optical recognition devices, remote control, or any other devices suitable for entering or retrieving data by one or more computer system 500. Multiple input/output devices may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

As shown in FIG. 5, memory 520 may include program instructions 525, configured to implement embodiments as described herein, and data storage 535, comprising various data accessible by program instructions 525. In one embodiment, program instructions 525 may include software elements of embodiments as illustrated in the above Figures. Data storage 535 may include data that may be used in embodiments. In other embodiments, other or different software elements and data may be included.

Those skilled in the art will appreciate that computer system 500 is merely illustrative and is not intended to limit the scope of a video moving module, rendering module, and compositing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, smart phone, tablet computing device, network device, internet appliance, PDA, wireless phones, pagers, a consumer device, video game console, handheld video game device, application server, storage device, a peripheral device such as a switch, modem, router, or in general any type of computing or electronic device. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
    receiving multimedia content to be displayed, wherein the multimedia content comprises multiple content layers and specified in the multimedia content is a rendering order of the multiple content layers;
    determining, automatically and independent of user input, that the multimedia content includes video content in one content layer that is not specified in the rendering order as a lowest content layer of the rendering order;
    moving the video content in response to said determining to the lowest content layer of the multiple content layers such that a content layer for the video content is changed from the one content layer to the lowest content layer subsequent to said receiving the multimedia content to be displayed;
    replacing a region of each layer between the one content layer and the lowest content layer with a transparent region, wherein each replaced region corresponds to a location from which the video content was moved; and
    sending the multimedia content to a rendering system, wherein said sending includes sending the lowest content layer to an accelerated video renderer of the rendering system.

2. The method of claim 1, wherein the rendering system requires video content at the lowest content layer for accelerated rendering.

3. The method of claim 1, wherein said sending comprises:
    sending other content layers not including the lowest content layer for rendering in one buffer and sending the lowest content layer that contains the video content for rendering in another buffer; and
    compositing the other content layers and lowest content layer together for display.

4. The method of claim 1, wherein the rendering system includes hardware for rendering the other content layers and different hardware for rendering the lowest content layer.

5. The method of claim 1, wherein the accelerated video renderer of the rendering system is a graphics processing unit (GPU) or dedicated video decoder hardware.

6. The method of claim 1, wherein said moving includes:
    determining a location of the video content within the one content layer;
    removing the video content from the determined location; and
    replacing the determined location of the one content layer with a transparent region.

7. The method of claim 1, wherein another content layer of the multiple content layers includes other video content, further comprising:
    moving the other video content to the lowest content layer; and
    replacing another region of each layer between the another content layer and the lowest content layer with another transparent region, wherein each replaced another region corresponds to another location from which the another video content was moved.

8. The method of claim 1, wherein the multimedia content, as originally received, includes at least one higher content layer of the multiple content layers that is above the one content layer that includes video content, wherein the at least one higher content layer is sent to the rendering system without replacing a region in the higher content layer with a transparent region.

9. A non-transitory computer-readable storage medium storing program instructions, wherein the program instructions are computer-executable to perform operations comprising:
    receiving multimedia content to be displayed, wherein the multimedia content comprises multiple content layers and specified in the multimedia content is a rendering order of the multiple content layers;
    determining, automatically and independent of user input, that the multimedia content includes video content in one content layer that is not specified in the rendering order as a lowest content layer of the rendering order;
    moving the video content in response to said determining to the lowest content layer of the multiple content layers such that a content layer for the video content is changed from the one content layer to the lowest content layer subsequent to said receiving the multimedia content to be displayed;
    replacing a region of each layer between the one content layer and the lowest content layer with a transparent region, wherein each replaced region corresponds to a location from which the video content was moved; and
    sending the multimedia content to a rendering system, wherein said sending includes sending the lowest content layer to an accelerated video renderer of the rendering system.

10. The non-transitory computer-readable storage medium of claim 9, wherein the rendering system requires video content at the lowest content layer for accelerated rendering.

11. The non-transitory computer-readable storage medium of claim 9, wherein the program instructions are further computer-executable to implement:
    sending other content layers not including the lowest content layer for rendering in one buffer and sending the lowest content layer that contains the video content for rendering in another buffer; and
    directing compositing the other content layers and lowest content layer together for display.

12. The non-transitory computer-readable storage medium of claim 9, wherein the rendering system includes hardware for rendering the other content layers and different hardware for rendering the lowest content layer, wherein the different hardware is a graphics processing unit (GPU) or dedicated video decoder hardware.

13. The non-transitory computer-readable storage medium of claim 9, wherein the program instructions are further computer-executable to implement:
   determining a location of the video content within the one content layer;
   removing the video content from the determined location; and
   replacing the determined location of the one content layer with a transparent region.

14. The non-transitory computer-readable storage medium of claim 9, wherein the multimedia content, as originally received, includes at least one higher content layer of the multiple content layers that is above the one content layer that includes video content, wherein the at least one higher content layer is sent to the rendering system without replacing a region in the higher content layer with a transparent region.

15. A system, comprising:
   a plurality of hardware resources including a central processing unit (CPU); and
   a memory comprising program instructions that are executable by the CPU to cause the system to perform operations including:
      receiving multimedia content to be displayed, wherein the multimedia content comprises multiple content layers and specified in the multimedia content is a rendering order of the multiple content layers;
      determining, automatically and independent of user input, that the multimedia content includes video content in one content layer that is not specified in the rendering order as a lowest content layer of the rendering order;
      moving the video content in response to said determining to the lowest content layer of the multiple content layers such that a content layer for the video content is changed from the one content layer to the lowest content layer subsequent to said receiving the multimedia content to be displayed;
      replacing a region of each layer between the one content layer and the lowest content layer with a transparent region, wherein each replaced region corresponds to a location from which the video content was moved; and
      sending the multimedia content to rendering hardware, wherein said sending includes sending the lowest content layer to an accelerated video renderer of the rendering hardware.

16. The system of claim 15, wherein the rendering hardware requires the video content at the lowest content layer for accelerated rendering.

17. The system of claim 15, wherein another one of the plurality of resources includes a graphics processing unit (GPU) or dedicated video decoder hardware configured to render the lowest content layer, wherein the program instructions are further executable by the CPU to render the other content layer.

18. The system of claim 15, wherein the program instructions are further executable by the CPU to:
   send other content layers not including the lowest content layer for rendering in one buffer and sending the lowest content layer that contains the video content for rendering in another buffer; and
   direct compositing the other content layers and lowest content layer together for display.

19. The system of claim 15, wherein to perform said removing and moving, the program instructions are further executable by the CPU to:
   determine a location of the video content within the one content layer;
   remove the video content from the determined location; and
   replace the determined location of the one content layer with a transparent region.

20. The system of claim 15, wherein the multimedia content, as originally received, includes at least one higher content layer of the multiple content layers that is above the one content layer that includes video content, wherein the program instructions are further computer executable to send the at least one higher content layer to the rendering system without replacing a region in the higher content layer with a transparent region.

* * * * *